United States Patent [19]

Tsao et al.

[11] 4,265,675

[45] May 5, 1981

[54] NONTOXIC CELLULOSE SOLVENT AND PROCESS FOR FORMING AND UTILIZING THE SAME

[75] Inventors: George T. Tsao, West Lafayette, Ind.; Bruce E. Dale, Fort Collins, Colo.; Michael R. Ladisch, West Lafayette, Ind.

[73] Assignee: Purdue Research Foundation, West Lafayette, Ind.

[21] Appl. No.: 81,539

[22] Filed: Oct. 3, 1979

Related U.S. Application Data

[63] Continuation-in-part of Ser. No. 884,477, Mar. 8, 1978, abandoned.

[51] Int. Cl.$^3$ .............................................. C13K 1/02
[52] U.S. Cl. ......................................... 127/37; 162/1; 162/76; 162/79; 162/90; 252/364; 252/397; 435/99
[58] Field of Search .................. 127/37; 252/397, 364; 162/1, 76, 79, 90; 435/99

[56] References Cited

U.S. PATENT DOCUMENTS

| | | | |
|---|---|---|---|
| 3,251,716 | 5/1966 | Porter | 127/37 |
| 4,024,335 | 5/1977 | Nicholson | 252/364 X |

OTHER PUBLICATIONS

D. Braun, Agnew. Makromol. Chem., 42(1), 77–89, (1975).
Chemical Abstracts, 51:10904a (1957).
Chemical Abstracts, 64:2269b (1966).

*Primary Examiner*—Sidney Marantz
*Attorney, Agent, or Firm*—John R. Nesbitt; Robert E. Harris

[57] ABSTRACT

A nontoxic cellulose solvent and process for forming and utilizing the same. The solvent includes a metal chelating agent, a metal compound, an oxygen scavenging stabilizing agent and a caustic swelling agent with the disclosed solvent being prepared in either aqueous or solid form. The solvent is caused to contact cellulosic materials in order to dissolve cellulose therefrom. The dissolved cellulose may be reprecipitated and may then be hydrolyzed by cellulose enzyme or acid to yield glucose with lignin being removed either before or after hydrolysis has occurred.

30 Claims, No Drawings

NONTOXIC CELLULOSE SOLVENT AND PROCESS FOR FORMING AND UTILIZING THE SAME

RELATED APPLICATION

This application is a continuation-in-part of Ser. No. 884,477, filed Mar. 8, 1978, now abandoned.

FIELD OF THE INVENTION

This invention relates to a nontoxic cellulose solvent and process for forming and utilizing the same, for example, for recovering cellulose which can be hydrolyzed to yield glucose.

BACKGROUND OF THE INVENTION

The utilization of cellulosic waste materials, such as cornstalks, sawdusts, straws, bagasse, and the like, hereinafter referred to as cellulosic material or cellulosic residue, has been the subject of strong interest recently, particularly with respect to utilization of such waste materials for developing alternate sources of fuels, feedstuffs, chemicals and other useful products.

It is known that cellulosic materials include three principal components—cellulose, hemicellulose and lignin. Methods for extraction or hemicellulose heretofore have been suggested and/or utilized and such extracted hemicellulose can be utilized by many existing methods including hydrolysis, fermentation, pyrolysis, and the like.

Lignin has also been isolated from cellulosic materials and since it is higher in hydrogen and carbon and lower in oxygen content than cellulose and hemicellulose it has the highest fuel utility of the three. Isolated lignin can be burned to generate steam and electricity and also can be used to produce a number of useful products including vanillin, dimethylsulfoxide, dimethyl sulfide, and methyl mercaptan and catechol.

Recovery of cellulose and/or utilization of the same, as by hydrolysis to provide glucose, has presented a problem heretofore primarily due to the crystalline structure of the cellulose molecules and the presence therein of a lignin seal.

While attempts have been made to hydrolyze cellulosic materials by means of acids or enzymes, such attempts have not been completely successful, at least not in providing an economically attractive method that is capable of providing a satisfactorily high yield of glucose from the cellulose in such cellulosic materials.

Also, while solvents have been suggested and/or utilized in conjunction with cellulosic materials, improvements in such solvents can still be utilized in recovering cellulose. In this regard, dissolution of pure cellulose using a ferric sodium tartrate based solvent heretofore has been suggested. See, for example, Valtassari, Papper och Trä 4 (1957) 243.

SUMMARY OF THE INVENTION

This invention provides a novel, nontoxic cellulose solvent and process for forming and utilizing the same, wherein the solvent comprises a metal chelating agent, a metallic agent or metal compound, a caustic swelling agent, and, preferably, a stabilizing agent. The solvent has been found particularly useful in recovering cellulose from cellulosic materials by contacting the cellulose from cellulosic materials with the solvent, which may be in aqueous or solid form. The dissolved cellulose may be recovered from the solvent by precipitation, whereafter the recovered cellulose may be hydrolyzed to yield glucose, with the lignin present in the cellulosic material being removed either before or after the hydrolysis.

Accordingly, it is an object of this invention to provide a novel nontoxic cellulose solvent.

It is another object to provide a stabilized nontoxic cellulose solvent.

It is another object of this invention to provide a novel nontoxic solvent for recovery of cellulose from cellulosic materials.

It is still another object of this invention to provide a novel nontoxic cellulose solvent that includes a metal chelating agent and a caustic swelling agent.

It is still another object of this invention to provide an improved method for forming a nontoxic cellulose solvent either in aqueous or solid form.

It is still another object of this invention to provide an improved method for recovering cellulose from cellulosic materials.

It is yet another object of this invention to provide an improved method for recovering cellulose from cellulosic materials utilizing a nontoxic cellulose solvent.

It is still another object of this invention to provide an improved method for yielding glucose from cellulose removed from cellulosic materials through use of a chelating metal caustic swelling solvent.

With these and other objects in view, which will become apparent to one skilled in the art as the description proceeds, this invention resides in the novel composition and method substantially as hereinafter described, and more particularly defined by the appended claims, it being understood that such changes in the precise embodiment of the herein disclosed invention are meant to be included as coming within the scope of the claims.

DESCRIPTION OF THE INVENTION

As is well known, cellulosic materials comprise cellulose, hemicellulose and lignin, wherein the cellulose molecules are contained therein the the form of highly ordered crystalline structures. It is also known that the lignin contained in the middle lamella of the cellulosic material poses a physical seal surrounding cellulose fibers and that the lignin, being hydrophobic in nature, tends to prevent any hydrolytic agents from penetrating the physical seal and contacting the cellulose molecules.

The nontoxic solvent of the invention is particularly useful for dissolving cellulose from cellulosic materials since it swells the material, thus rupturing the lignin seal and providing the solvent with ready access to the crystalline cellulose molecules. This dual action enables the solvent to dissolve or otherwise degrade the crystalline structure of the cellulose molecules, thereby to separate the cellulose from the remainder of the cellulosic material. The dissolved cellulose may then be precipitated from the solvent in an "amorphous" state, either in the presence of the solid lignin-containing residue or after the lignin-containing residue and the cellulose-containing solvent have been separated, thus rendering the cellulose portion of the original cellulosic material free from its ordered crystalline structure and lignin seal, and thus very accessible for hydrolysis to glucose.

As used throughout this specification and claims, the term "amorphous" state is meant to describe the disrupted physical state of the cellulose molecules while in solution and for that period of time after reprecipitation and before reversion to the highly ordered crystalline structure associated with native cellulose. When in such "amorphous" state, cellulose is much more readily hydrolyzable than when in the crystalline, native state.

The nontoxic solvent of this invention is useful in contacting cellulosic materials to dissolve and swell the crystalline cellulose molecules in situ, and at the same time rupture the lignin seal. This action enables the cellulose to be recovered and makes the cellulose very accessible for hydrolysis since it is no longer protected by its crystalline structure or the lignin seal.

A solvent in accordance with the present invention for extracting and dissolving cellulosic materials generally has the following components:

(a) an agent to give a high pH, i.e., caustic, or a low pH to loosen the cellulose structure;

(b) a metal ion, e.g., ferric, ions, to get into the structure;

(c) a maintaining chelating agent, such as tartaric acid, citric acid, gluconic acid or the like or alkali metal salts thereof or mixtures that can keep the metal in solution; and (d) preferably, an agent to stabilize the solvent.

Analysis of the chemical nature of known cellulose solvents leads to a generalized acronym for these substances of CXXS. The initial C signifies a chelating agent while the following X signifies a specific type of chelating agent. The S indicates a cellulose swelling agent while the second X specifies the particular swelling agent. The solvent of the present invention is composed of a metal chelating agent plus a caustic swelling agent. Hence the solvent of the present invention will be referred to hereinafter as CMCS, which denotes Chelating Metal Caustic Swelling.

In one embodiment, the solvent of this invention comprises an aqueous solution of sodium tartrate, ferric chloride and caustic which is stabilized by any one of a number of oxygen scavengers such as, for example, sodium sulfite, glucose, galactose, other hexoses, hydrazine or the like or mixtures thereof. The sodium tartrate may comprise from about 15% to about 20%, and preferably from about 16% to about 18% of the solvent (all percentages given by weight unless noted otherwise). The ferric chloride may comprise from about 3% to about 10%, preferably from about 5.5% to about 7.5% of the solvent. The caustic, which preferably is sodium hydroxide, may comprise from about 4% to about 15% of the solvent, although the amount of caustic in the solvent preferably is from about 6% to about 9%. The stabilizer or oxygen scavenger is employed in an amount from about 2.5% to about 11%, with amounts ranging between about 4.5% and about 8.5% being preferred. A particularly suitable solvent in accordance with the present invention can be prepared by dissolving the following components in water:

| | |
|---|---|
| $FeCl_3 \cdot 6H_2O$ | about 10g |
| Tartaric Acid | about 17g |
| NaOH | about 22g |
| $Na_2SO_3$ | about 13g |
| + water | to a total of 200g. |

All of the components of the present solvent are easy to handle and nontoxic, which simplifies their use in the proposed process.

The addition to the solvent of an oxygen scavenger, preferably an edible oxygen scavenger, such as sodium sulfite, glucose, other hexoses or the like in the proportions indicated protects the iron in the solvent against oxidation, yet does not interfere with the solvent's ability to dissolve cellulose. In this regard, it will be noted that use of a ferric sodium tartrate based solvent (as mentioned hereinabove and described by Valtassari) is not practical in the process of the present invention since the temperatures required to evaporate the wash water also cause precipitation of the iron sodium tartrate complex with resultant loss of solvent capability. The solvent of this invention does not have this shortcoming.

The treatment of cellulosic material in accordance with one embodiment of the present invention to dissolve the ordered crystalline cellulose molecules contained therein involves contacting the cellulosic material with the present aqueous solvent in a ratio of from about 10:1 to 1:10 cellulosic material: solvent on a weight ratio. The cellulosic material/solvent contact may be effected for periods as short as about one-half hour and as long as about three months and at temperatures of from about 35° C. to about −35° C. This contacting results in the dissolution of the highly ordered crystalline cellulose molecules such that the cellulose is present in the solvent in a less crystalline, more readily hydrolyzable "amorphous" state. At this point, the solid residue which contains the lignin originally present in the cellulosic material may be separated from the cellulose-containing solvent by filtration, centrifugation or the like. However, since the lignin no longer is present in the form of a lignin seal and since the lignin will remain solid even after the now "amorphous" cellulose is hydrolyzed, there is no need for separating the lignin-containing residue from the dissolved "amorphous" cellulose.

At this point in the process, regardless of whether the lignin-containing residue is separated, from about 1 to about 10 volumes of water per volume of solvent, and preferably, from about 1 to 2 volumes of water per volume of solvent, is added to the cellulose-containing solvent to reprecipitate the "amorphous" cellulose. The solvent is then washed with water from the reprecipitated "amorphous" cellulose (and from the lignin-containing residue if this residue was not separated from the cellulose-solvent prior to the reprecipitation step). The diluted solvent (wash solution) can be concentrated by vacuum evaporation to its initial concentration and reused. The cellulose in the residue, having been dissolved and then reprecipitated in an "amorphous" state, on removal of the solvent, may be hydrolyzed by acid or cellulase enzyme to give a substantially quantitative yield of glucose. The lignin preferably is removed after the hydrolysis of the "amorphous" cellulose, but, as indicated above, the lignin can be removed before precipitating the cellulose and before hydrolyzing the cellulose to yield glucose. In either case, the lignin is separated by filtration, centrifugation or the like. It has been found that the reprecipitated "amorphous" cellulose will revert to the more crystalline and thus more difficultly hydrolyzable form on standing for only a few hours. Accordingly, it is preferred that the "amorphous" cellulose be hydrolyzed relatively shortly after being reprecipitated. However, it also has been found that the stability of the "amorphous" cellulose can be increased significantly by storing the same at either a high pH (greater than about 11) or a low pH (less than about 5).

An alternative to treating the cellulosic residue with an aqueous CMCS solvent involves contacting the residue directly with a dry solvent powder. This powder is obtained by treating the aqueous CMCS solvent as described previously with at least about 0.2, and preferably from about 0.25 to about 5 volumes of a water soluble organic solvent such as methyl alcohol, ethyl alcohol, butyl alcohol, acetone or the like per volume of CMCS, collecting the resulting green precipitate and drying the precipitate to a fine powder.

When using this solid or dry CMCS solvent to dissolve the cellulose contained in a cellulosic residue, the dry powder is mixed thoroughly with the cellulosic residue. The moisture in the residue (normally from about 10% to about 200% on a dry matter weight basis) dissolves the powder, thus providing intimate contact between the solvent and residue and a resultant dissolution of the cellulose in situ.

Generally speaking, an economically viable process for cellulose saccharification must meet two major constraints. First, the solvent must be recoverable so that it can be recycled quantitatively. Second, saccharification of the cellulose must be substantially complete. When the process as described herein employing CMCS solvent is used, both of these constraints are met.

Another advantageous feature of the present process is that the liquid CMCS solvent is not sensitive to the initial moisture content of the cellulosic residue used. This is not the case with many other cellulose saccharification processes. Hence, the residue need not be subjected to a drying operation prior to treatment with the present solvent.

With regard to the solid phase or dry powdered solvent, several additional economic advantages present themselves. First, it is possible to reduce the ratio of total CMCS solvent to cellulosic residue required for cellulose dissolution due to more intimate mixing and contacting. This in turn reduces both capital and operating costs, particularly in steps where the solvent is washed from the residue. Second, a solid solvent powder also makes possible the centralized manufacture of solvent which can be shipped dry to individual plants utilizing cellulosic materials. This obviously results in savings in capital and operating costs. Finally, since the solid powder combines with the moisture normally found in the residue to dissolve the cellulose in situ, the larger fluid volumes associated with the liquid CMCS solvent are not required and process equipment can be smaller.

The following examples are illustrative of the invention.

EXAMPLE I

In Situ Dissolution and Hydrolysis of Corn Residue (a) Preparation of CMCS Solvent:

Sodium tartrate, ferric chloride, sodium hydroxide and sodium sulfite were dissolved in water to give a solution containing, respectively, 17%, 6.6%, 7.8% and 6.2% of each of the above components. This solvent, which was capable of dissolving up to 40 grams/liter of crystalline α-cellulose, is liquid CMCS.

Addition of about 0.25 volume methanol to 1 volume of the above resulted in a green precipitate which, when filtered off and dried yielded a green powder. This powder was dissolved in sufficient water to yield a solvent having the concentration outlined above. The reconstituted solvent dissolved cellulose and had the same efficacy as the original solvent. The powder is dry CMCS.

(b) Preparation of Enzyme:

An enzyme preparation, hereinafter referred to as "CW", was made as follows: Ten grams of a commercial cellulase prepared from Trichoderma viride (Enzyme Development Corporation, Lot. No. WR 1432) were dissolved in 100 milliliters of water. Next, 57 grams of ammonium sulfate were added. Upon mixing, the ammonium sulfate dissolved and a white precipitate formed. This precipitate was separated by centrifugation and re-dissolved in 30 milliliters of water. The solution was then desalted using Sephadex G-25 (Pharmacia Corporation) and made up to a final volume of about 100 milliliters.

(c) In Situ Dissolution and Hydrolysis of Corn Residue:

Corn residue, ground to greater than 40 mesh particle size, and liquid CMCS were combined in a weight ratio of 1:4.9 corn residue:CMCS. After standing twelve hours water was added, causing the cellulose in the corn residue to reprecipitate and the solvent to be washed out. The solvent is recoverable.

The pretreated residue, which contained reprecipitated "amorphous" cellulose together with the lignin-containing solids portion of the initial corn residue was combined with water, buffer and enzyme preparation "CW" to give a solution containing 2.5% residue. Incubation of the mixture at 45° C. for 45 hours gave 78% conversion of the α-cellulose to glucose. Since the solvent pretreatment and subsequent cellulose reprecipitation was done without first separating the solvent containing dissolved cellulose from the lignin-containing solid residue, this technique was referred to as "in situ" dissolution (and reprecipitation).

(d) In Situ Dissolution and Hydrolysis of Corn Residue—Control Study:

Using the same procedure as in Example 1 (c), corn residue was treated with CMCS solvent, washed with water to reprecipitate "amorphous" cellulose and wash out the solvent, and hydrolyzed with enzyme. In 24 hours, 85% conversion of the α-cellulose to glucose was obtained.

As a control untreated corn residue was hydrolyzed in the same way. Conversion to glucose in this case was only 20%.

Buildup of impurities in the solvent stream within a processing operation may be prevented by occasional precipitation of solid CMCS from the liquid stream using methanol as described above. Small molecular weight impurities would remain in solution while the CMCS solid powder was removed and purified thereby.

EXAMPLE 2

Recovery of CMCS Solvent (a) Recovery of CMCS from Bagasse

Sugar cane bagasse mixed with aqueous CMCS (prepared in accordance with Example 1 (a)) in a 1:5 weight ratio (1:4 volume ratio) was washed with water at a ratio of 3 volumes water to 1 volume aqueous CMCS. A mass balance based on liquid chromatographic analysis of the wash water showed essentially complete recovery of the solvent.

(b) Concentration of Diluted CMCS

CMCS diluted with up to 3 volumes water was reconcentrated at 35° C. under reduced pressure. The dilution and subsequent reconcentration had no apparent deleterious effect on the solvent activity of the CMCS.

(c) Recovery of CMCS from Crystalline α-cellulose

One volume of Avicel, a commercial crystalline α-cellulose (obtainable from FMC) was mixed with 5 volumes aqueous CMCS (prepared in accordance with Example 1 (c)) resulting in its dissolution. After standing, the cellulose was reprecipitated and washed using 3.0 volumes water per volume CMCS. The diluted CMCS was then concentrated to its original strength using evaporation at reduced pressure. The reconcentrated CMCS retained its original solvating power.

Thus, in view of the foregoing description and illustrative examples, it is evident that the solvent and process of the present invention can provide the following and other advantages:

a. An essentially complete non-destructive hydrolysis of the cellulose in a cellulosic residue;

b. a process which is not sensitive to the moisture content of the cellulosic residue;

c. a solvent which simply and efficiently can be recovered and recycled;

d. a solvent which is relatively easy to handle and which creates no safety problems in the work place;

e. a solvent which may be used dry to provide direct contacting of solvent and residue, saving both capital and operating costs;

f. the feasibility of a centralized facility for producing a dry CMCS cellulose solvent, thus improving the economic viability of the proposed cellulose saccharification process; and g. a process wherein crystalline cellulose is dissolved, reprecipitated in an "amorphous" form and hydrolyzed in situ by cellulase enzyme or acid.

Although certain preferred embodiments of the invention have been disclosed for purpose of illustration, it will be evident that various changes and modifications may be made therein without departing from the scope and spirit of the invention as set forth in the following claims.

What is claimed is:

1. A substantially nontoxic cellulose solvent, comprising:
   a metal chelating agent;
   a metal compound;
   a caustic swelling agent;
   and an oxygen scavenging stabilizing agent.

2. The solvent of claim 1 wherein said solvent is in liquid form.

3. The solvent of claim 1 wherein said solvent is in solid form.

4. The solvent of claim 1 wherein said metal compound is ferric chloride and said caustic swelling agent is sodium hydroxide.

5. A substantially nontoxic cellulose solvent, comprising:
   sodium tartrate;
   ferric chloride;
   caustic;
   and an oxygen scavenging stabilizing agent.

6. The solvent of claim 5 wherein said oxygen scavenging stabilizing agent is selected from the group consisting of sodium sulfite, glucose, galactose, other hexoses hydrazine and mixtures thereof.

7. The solvent of claim 2, which comprises, by weight, from about 3% to about 10% ferric chloride as said metal compound; from about 4% to about 15% sodium hydroxide as said caustic swelling agent; and from about 2.5% to about 11% of said oxygen scavenging stabilizing agent.

8. The solvent of claim 5, which comprises, by weight, from about 15% to about 20% sodium tartrate; from about 3% to about 10% ferric chloride; from about 4% to about 15% of said caustic; and from about 2.5% to about 11% of said oxygen scavenging stabilizing agent.

9. The solvent of claim 8, which comprises, by weight, from about 16% to about 18% sodium tartrate; from about 5.5% to about 7.5% ferric chloride; from about 6% to about 9% of said caustic; and from about 4.5% to about 8.5% of said oxygen scavenging stabilizing agent.

10. The solvent of claim 9, wherein said caustic comprises sodium hydroxide, and wherein said oxygen scavenging stabilizing agent is selected from the group consisting of sodium sulfite, glucose, galactose, other hexoses, hydrazine and mixtures thereof.

11. The solvent of claim 9, which comprises, by weight, about 17% sodium tartrate, about 6.6% ferric chloride, about 7.8% caustic, and about 6.2% sodium sulfite.

12. A substantially nontoxic solvent for dissolving and extracting cellulose from cellulosic material, which comprises:
    a caustic swelling agent for providing a high pH to loosen the cellulose structure of contacted cellulosic material;
    a metallic agent for giving access to said cellulose structure;
    a maintaining agent for keeping said metallic agent in solution; and
    an oxygen scavenging stabilizing agent for stabilizing the solvent.

13. The solvent of claim 12, wherein said maintaining agent is selected from the group consisting of tartaric acid, citric acid, glyconic acid and alkali metal salts thereof.

14. The solvent of claim 13, wherein said maintaining agent is tartaric acid, wherein said metallic agent is $FeCl_3$, wherein said loosening agent is NaOH, and wherein said oxygen scavenging stabilizing agent is $Na_2SO_3$.

15. The solvent of claim 14, which comprises about 10 g. of $FeCl_3.6H_2O$, about 17 g. of tartaric acid, about 22 g. of NaOH, about 13 g. of $Na_2SO_3$, and water to a total of about 200 g.

16. A method for preparing a substantially nontoxic aqueous, cellulose solvent, comprising:
    adding tartaric acid to ferric chloride in water;
    adding sodium hydroxide; and
    adding an oxygen scavenging stabilizing agent to stabilize the aqueous solvent.

17. The method of claim 16, wherein said oxygen scavenging stabilizing agent is selected from the group consisting of sodium sulfite, glucose, galactose, other hexoses, hydrazine and mixtures thereof.

18. The method of claim 16, wherein said oxygen scavenging stabilizing agent is sodium sulfite.

19. A method for preparing a solid cellulose solvent, said method comprising:
    adding to water a metallic agent which is capable of giving access to the cellulose structure in a cellulosic material and a maintaining agent for keeping said metallic agent in solution;
    adding a caustic swelling agent and an oxygen scavenging stabilizing agent to the solution formed in the previous step to provide a stabilized aqueous chelating metal caustic solvent;

contacting said aqueous chelating metal caustic solvent with at least about 0.2 volumes of a water soluble organic solvent per volume of said aqueous solvent to precipitate a solid cellulose solvent; and separating said precipitated cellulose solvent from the mother liquor from which it was precipitated.

20. The method of claim 19, wherein said metallic agent comprises ferric chloride; wherein said maintaining agent is selected from the group consisting of tartaric acid, citric acid, gluconic acid and alkali metal salts and mixtures thereof; wherein said caustic swelling agent comprises sodium hydroxide; and wherein said oxygen scavenging stabilizing agent is selected from the group consisting of sodium sulfite, glucose, galactose, other hexoses, hydrazine and mixtures thereof.

21. The method of claim 20, wherein said solid cellulose solvent is precipitated using from about 0.25 to about 5.0 volumes of methyl alcohol as said organic solvent for each volume of aqueous solvent being contacted.

22. A process for recovering cellulose from cellulosic materials, said process comprising:

contacting a cellulosic material with an oxygen scavenger stabilized chelating metal caustic swelling solvent to dissolve the crystalline native cellulose contained in said cellulosic material and to transform the crystalline cellulose to an amorphous state; and precipitating said amorphous cellulose from said solvent.

23. The process of claim 22, wherein said chelating metal caustic swelling solvent includes sodium tartrate, ferric chloride, and caustic stabilized by an oxygen scavenger selected from the group consisting of sodium sulfite, glucose, galactose, other hexoses, hydrazine and mixtures thereof.

24. The process of claim 23, wherein said chelating metal caustic swelling solvent comprises an aqueous solvent at the time when the cellulosic material is contacted therewith.

25. The process of claim 23, wherein said chelating metal caustic swelling solvent is in solid form when the cellulosic material is contacted therewith, and wherein said solvent and the cellulosic material are intermixed during the contacting step.

26. The process of claim 22, wherein the cellulosic material is contacted with said chelating metal caustic swelling solvent in a weight ratio of from about 10:1 to about 1:10 cellulosic material:solvent.

27. The process of claim 22, wherein said precipitation of said amorphous cellulose is effected by addition of water.

28. The process of claim 27, wherein said chelating metal caustic swelling solvent is recovered from said water and is concentrated for recycle.

29. A process for recovering cellulose from a cellulosic material, said process comprising:

providing a chelating metal caustic swelling solvent, said solvent comprising sodium tartrate, ferric chloride, caustic, and sodium sulfite;

contacting a cellulosic material with said solvent in about a 10:1 to 1:10 weight ratio of cellulosic material to solvent; and adding water to precipitate cellulose from the solution formed by contacting the cellulosic material with said solvent.

30. The process of claim 29, wherein said cellulose is hydrolyzed by acid and/or cellulase enzyme to yield glucose.

* * * * *